United States Patent [19]
Moriya et al.

[11] 4,002,153
[45] Jan. 11, 1977

[54] INTAKE SYSTEM IN INTERNAL COMBUSTION ENGINE

[75] Inventors: Hisanori Moriya; Shoji Shimo, both of Katsuta, Japan

[73] Assignee: Hitachi, Ltd., Japan

[22] Filed: Aug. 4, 1975

[21] Appl. No.: 601,665

[30] Foreign Application Priority Data

Aug. 16, 1974 Japan .............................. 49-94016

[52] U.S. Cl. ................... 123/32 ST; 123/139 AW; 123/127; 123/75 B
[51] Int. Cl.[2] .................... F02B 19/10; F02B 19/18
[58] Field of Search ...... 123/75 B, 139 AW, 32 SP, 123/32 ST, 127

[56] References Cited
UNITED STATES PATENTS

| | | | |
|---|---|---|---|
| 2,894,735 | 7/1959 | Zupancic | 123/139 AW |
| 3,174,470 | 3/1965 | Von Seggern | 123/32 ST |
| 3,443,552 | 5/1969 | Von Seggern | 123/32 ST |

*Primary Examiner*—Charles J. Myhre
*Assistant Examiner*—Ronald B. Cox
*Attorney, Agent, or Firm*—Craig & Antonelli

[57] ABSTRACT

An intake system adapted to be used in combination with an internal combustion engine having a main combustion chamber and a preliminary or subcombustion chamber equipped with an ignition plug. There is provided an intake cylinder having a venturi portion which allows the passing of the total amount of air being fed to both combustion chambers and a throttle valve controlling the amount of air being fed to respective combustion chambers. The intake cylinder is divided into a main intake passage and sub-intake passage, both of which lead to both combustion chambers, respectively. A metering orifice is provided in the sub-intake passage, so that a ratio in amount, of air passing through respective intake passages may be maintained at a given value. In respective intake passages, there are provided fuel discharge values, to which are connected fuel passages leading from a single fuel pressure controlling valve for use in providing fuel pressure commensurate with the negative pressure in the venturi portion. By the provision of the metering orifices in respective fuel passages, a ratio in flow rate, of fuel being introduced to respective fuel discharge valves is maintained at a given value. Thus, there is provided an intake system in which a ratio in flow rate, of mixture charges being fed to the main combustion chamber and the sub-combustion chamber, as well as a ratio in air-fuel-ratio, of mixture charges being fed thereto are maintained constant.

10 Claims, 3 Drawing Figures

INTAKE SYSTEM IN INTERNAL COMBUSTION ENGINE

BACKGROUND OF THE INVENTION

This invention relates to an internal combustion engine of the so-called "torch type", wherein a combustion chamber is composed of a main combustion chamber and a preliminary or sub-combustion chamber equipped with an ignition plug, and both combustion chambers are communicated with each other by way of a through-hole, thereby firing a lean mixture charge in the main combustion chamber by utilizing a flame produced in the sub-combustion chamber, and more particularly to a device for feeding a mixture charge to both combustion chambers.

In an internal combustion engine of the type described, it is imperative to feed a lean mixture charge to the main combustion chamber and a rich mixture charge to the sub-combustion chamber. To this end, hitherto, plural intake systems have been separately provided for use in the main combustion chamber and in the sub-combustion chamber. More specifically, independent intake cylinders are connected to the main combustion chamber and the sub-combustion chamber, respectively. These intake cylinders respectively have a throttle valve and a fuel controlling system, and the throttle valves of respective intake cylinders are interconnected with each other by means of linkage or cam mechanism. As a consequence, the device has been complicated in construction and expensive to manufacture. A mixture charge to be fed to the sub-combustion chamber, in general, requires energy proportional to that of the mixture charge being fed to the main combustion chamber, and ratio in amount, of air being fed to the main chamber so that of the sub-combustion chamber, as well as a ratio in air-fuel-ratio of mixture charges being fed to the main combustion chamber to that of the sub-combustion chamber should also desirably be maintained in proportion to each other. However, in case a duplex carbureter is adopted for a main combustion chamber, it has been impossible to maintain the air fuel ratios for the main combustion chamber and the sub-combustion chamber in proportional relation.

It is accordingly an object of the present invention to provide an intake system in an internal combustion engine having a main combustion chamber and a preliminary or sub-combustion chamber, which permits to feed a mixture charge both to the main combustion chamber and to the sub-combustion chamber, and which is simple in construction.

It is another object of the present invention to provide an intake system in which mixture charges may be fed to the main combustion chamber and the sub-combustion chamber substantially at a given ratio in its amount, with a given ratio in air-fuel-ratio maintained constant.

To attain the objects of the present invention, there is used an injection carburetor, in which a negative pressure in a venturi portion is detected, to thereby control a fuel pressure as well as control a flow rate of fuel. In order to feed air to the main combustion chamber and the sub-combustion chamber, there are provided a single intake cylinder having a venturi portion which allows the passing of the total amount of air to be fed to both combustion chambers and a throttle valve for controlling the amount of air to be fed thereto; a main intake passage leading from the intake cylinder to the main combustion chamber; and a sub-intake passage stemed from the intake cylinder and leading to the sub-combustion chamber. The total amount of air to be fed to both combustion chambers is controlled by the single throttle valve, while a ratio in amount, of air being fed to the main combustion chamber and the sub-combustion chamber is maintained at a given valve which is determined according to resistance imposed on air passing through the main intake passage and the sub-intake passage. To feed fuel to both combustion chambers, there are provided; fuel discharge devices attached to the main intake passage and sub-intake passage, respectively; a fuel pressure controlling device for providing fuel pressure commensurate with a negative pressure in the venturi portion; and main and sub-fuel passages which connect the fuel pressure controlling device to respective fuel discharge devices. A ratio in flow rate, of fuel being introduced into one fuel discharge device and into the other fuel discharge device is maintained at a given valve which is determined according to resistance imposed on fuel passing through the main fuel passage and the sub-fuel passage, while a flow rate of fuel in respective fuel passage fluctuates according to a negative pressure in the venturi portion. Thus, the amount of a mixture charge being fed to the main combustion chamber and that of a mixture charge being fed to the sub-combustion chamber are usually maintained in proportion to each other, while a ratio in air-fuel-ratio, of the mixture charge being fed to the main combustion chamber and to the sub-combustion chamber is usually maintained constant. Only the sub-intake passage, fuel discharge device and sub-fuel passage are necessary for feeding a mixture charge to the sub-combustion chamber, so that the intake system of the present invention is extremely simple in construction.

In the preferred embodiments of the present invention, a metering orifice is provided in the sub-intake passage for determining a ratio in amount, of air to be fed to the main combustion chamber and to the sub-combustion chamber to a given value, while metering orifices are provided in the main fuel passage and sub-fuel passage, respectively, for providing a given ratio in amount, of fuel to be introduced to the main intake passage and to the sub-intake passage. The use of the metering orifices make it easy to provide a given ratio in amount, of air being fed to the main combustion chamber and to the sub-combustion chamber, as well as a ratio in amount of fuel being introduced into respective passages.

These and other objects and features of the present invention will be apparent from the ensuring part of the specification in conjunction with the drawings which indicate preferred embodiments of the present invention.

DETAILED DESCRIPTION OF THE PREFERRED EMBODIMENTS

Figure 1:
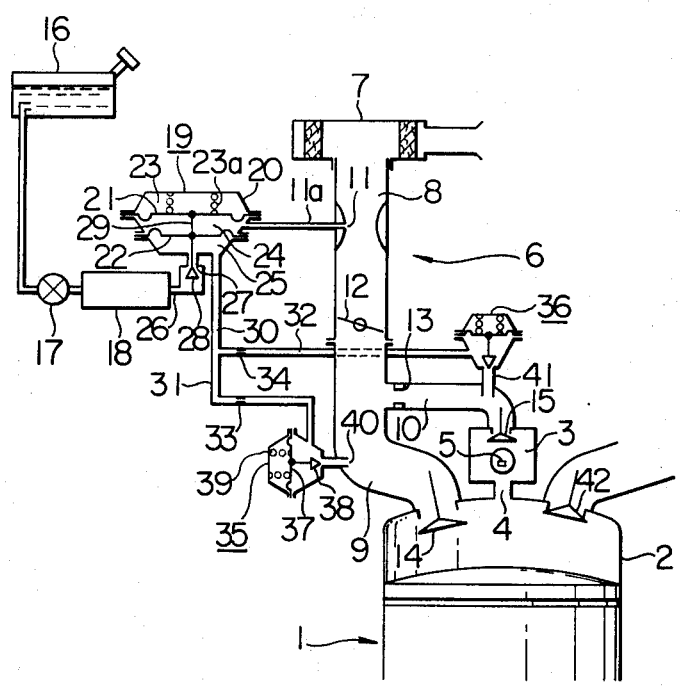
FIG. 1 is a longitudinal cross-sectional view showing a preferred embodiment of the present invention; and, FIGS. 2 and 3 are longitudinal cross-sectional views showing further embodiments of the present invention, respectively.

Referring to FIG. 1, an engine 1 has a main combustion chamber 2 and a preliminary or sub-combustion chamber 3, both of which are communicated with each other by way of a through-hole 4. The sub-combustion chamber 3 involves therein an ignition plug 5. An intake system of the engine 1 is composed of an air cleaner 7, an intake cylinder 8, a main intake passage 9 leading from the intake cylinder 8 to the main combustion chamber 2, and a sub-intake passage 10 stemed from the intake cylinder 8 and leading to the sub-combustion chamber 3. In the intake cylinder 8, there are provided a venturi portion 11 and a throttle valve 12, which controls the total amount of air being fed to the main combustion chamber 2 and the sub-combustion chamber 3. The sub-intake passage 10 is stemed from the intake cylinder 8, downstreams of the throttle valve 10 and provided with a metering orifice 13. The metering orifice 13 is provided for increasing resistance imposed on air passing through the sub-intake passage 10 as well as for setting to a given value a ratio in amount, of air passing through the main intake passage 9 and the sub-intake passage 10. If a diameter of the sub-intake passage 10 is reduced and resistance imposed on air passing therethrough is increased to a given level, then the metering orifice 13 may be omitted. An intake valve 14 is disposed in a portion connecting the main intake passage 9 to the main combustion chamber 2, while an intake valve 15 is disposed in a portion connecting the sub-intake passage 10 to the sub-combustion chamber 3.

A fuel feeding system will be referred to hereunder. Connected by way of a fuel pump 17 and a filter 18 to a fuel tank 16 is a fuel pressure controlling valve 19, which has a casing 20, a diametrically large diaphragm 21 and a diametrically small diaphragm 22, both of which are disposed in the casing to thereby define three chambers 23, 24 and 25. The chamber 25 is communicated by way of an opening 27 with a passage 26 leading from the filter 18, said opening being adapted to be opened and closed by a valve body 28. The valve body 28 is rigidly secured to a valve rod 29 secured to the diaphragms 21 and 22 integrally therewith. A fuel passage 30 is connected to the chamber 25. The intermediate chamber 24 is communicated through a passage 11a with the venturi portion 11. The chamber 23 is open to atmosphere. A coil spring 23a is provided in the chamber 23, thereby pressing the diaphragm 21 downwards. Thus, if a negative pressure in the venturi portion 11 is fed to the intermediate chamber 24, then fuel pressure commensurate with the negative pressure thus fed is produced in the chamber 25. This will be further referred to by using the expression. Assuming that Pv is representative of a negative pressure in the venturi, Pf is a fuel pressure in the chamber 25, S1 and S2 are cross-sectional areas of the diaphragms 21 and 22, respectively, and F is a force of the spring 23a, then, $$Pf \ S2 = (S1 - S2) \ Pv + F \quad Pf = (S1 - S2/S2) \ Pv + F/S2 \qquad 1.$$

From the formula (1), it is seen that the fuel pressure Pf in the chamber 25 is proportional to the negative pressure Pv in the venturi.

The fuel passage 30 communicating with the chamber 25 is branched into a main fuel pipe 31 and a sub-fuel pipe 32, both of which are provided with metering orifices 33 and 34 internally thereof, respectively. The main fuel pipe 31 is connected to the fuel discharge valve 35 communicating with the main intake passage 9, while the sub-fuel pipe 32 is connected to the fuel discharge valve 36 communicating with the sub-intake passage 10. The fuel discharge valve 35 has a diaphragm 37 partitioning the interior of the valve into two chambers, a valve body 38 actuating integrally with the diaphragm 37, and a spring 39 exerting pressure of a given level on the diaphragm 37, whereby fuel is injected under a constant pressure through a discharge port 40 into the main intake passage 9. The fuel discharge valve 36 is the same in construction as the fuel discharge valve 35, so that fuel will be injected under a constant pressure through a discharge port 41 into the sub-intake passage 10. The fuel discharge valve 35 and 36 are so designed as to inject fuel substantially at the same pressure level. In FIG. 1, shown at 42 is an exhaust valve provided in the engine 1.

In operation, air which has passed through the air cleaner 7 and the venturi portion 11 is introduced to the throttle valve 12, in which a flow rate of air is controlled. The major part of the air is introduced under suction via the main intake passage 9 into the main combustion chamber 2, while the rest is introduced under suction via the sub-intake passage 10 into the sub-combustion chamber 3. A ratio in amount, of air being introduced under suction into the main combustion chamber 2 and the sub-combustion chamber 3, is determined according to resistance imposed on air passing through the main intake passage 9 and the intake valve 14, and resistance imposed on air passing through the sub-intake passage 10 and the intake valve 15, so that a desired ratio in amount of air may be obtained by designing the metering orifice 13 suitably, and the aforesaid ratio is maintained constant, independently of an increase or a decrease in the total amount of air passing through the throttle valve 12. On the other hand, fuel is introduced under suction from the fuel tank 16, via the fuel pump 17 and filter 18, into the chamber 25 in the fuel pressure controlling valve 19, and then via the passage 30, the metering orifices 33 and 34 in the passages 31 and 32, into the fuel discharge valves 35 and 36, from which the fuel is injected into the main intake passage 9 and the sub-intake passage 10. Since the pressure in the fuel discharge valve 35 and that in the fuel discharge valve 36 are equal, a ratio in amount, of fuel being introduced from the chamber 25 into one fuel discharge valve 35 and into the other fuel discharge valve 36 is at a given value, irrespective of a flow rate of fuel passing through the passage 30, the aforesaid given value being determined according to resistance imposed on fuel when passing through the passages 31 and 32 (the resistance is mostly produced in the metering orifices 33 and 34). The metering orifices 33 and 34 are provided for producing a given level of resistance for the passages 31 and 32, whereby fuel may be fed at a given distribution ratio to respective combustion chambers. If there is produced in the passages 31 and 32 resistance of a given level imposed on fuel when passing therethrough, the metering orifices 33 and 34 may be omitted. As an alternative, in place of the metering orifices 33 and 34, valves may be used. Thus, the ratio in amount, of air passing through the main intake passage 9 and through the sub-intake passage 10, as well as the ratio in amount, of fuel being injected into the main intake passage 9 and into the sub-intake passage 10 are both maintained constant. Negative pressure in the venturi portion and fuel pressure in the chamber 25 in the fuel pressure controlling valve 19, i.e. pressure of fuel prevailing on the upstream sides of the orifices 33 and 34, are maintained at a given ratio, while the pressure of fuel prevailing of the downstream sides of the orifices 33 and 34 is maintained substantially constant by the fuel discharge valves 35 and 36. Thus, if the ratio of the negative pressure to the fuel pressure in the chamber 25 and the pressure prevailing on the downstream sides of the orifices are set to a proper value, then an amount of fuel passing through the orifices 33 and 34 may be maintained proportional to the amount of air passing through the venturi 11. This is represented by the following formula. Assuming that $Qa$ is representative of an amount of air passing through the venturi portion 11, then, $$Qa = C \sqrt{Pv} \qquad 2.$$

wherein $c$ is a flow coefficient.

Since air which has passed through the venturi portion 11 is introduced by a given ratio into the main intake passage 9, assuming that $Qa'$ is representative of an amount of air passing through the main intake passage 9, then, $$Qa' = k\, Qa = k\, c\, \sqrt{Pv} \qquad 3.$$

wherein $k$ is a constant.

Assuming that $Qf$ is representative of a flow rate of fuel being injected from the fuel discharge valve 35 into the main intake passage 9 and $Pc$ is fuel pressure in the fuel discharge valve 35, then, $$Qf = c' \sqrt{Pf - Pc} \qquad 4.$$

wherein $c'$ is a flow coefficient of fuel passing through the passage leading from the chamber 25 to the fuel discharge valve 35.

If the formula (1) is substituted for the formula (4), then, $$Qf = c' \sqrt{\frac{S1 - S2}{S2} Pv + \frac{F}{S2} - Pc} \qquad 5.$$

If fuel pressure in the fuel discharge valve is determined to a value obtained by the formula:

$$Pc = \frac{F}{S2} \qquad 6.$$

then, $$Qf = c' \sqrt{\frac{S1 - S2}{S2}} \sqrt{Pv} \qquad 7.$$

From the expressions (3) and (7), $$\frac{Qf}{Qa'} = \frac{c' \sqrt{\frac{S1 - S2}{S2}}}{k \cdot c} = \text{const.} \qquad 8.$$

Thus, an air-fuel-ratio of the mixture charge being fed to the main intake passage is constant irrespective of an amount of air introduced. Similarly, an air-fuel-ratio of the mixture charge being fed to the sub-intake passage is contant, independently of an amount of air introduced. The air-fuel-ratio of a mixture charge is essentially determined by a cross-sectional area of the metering orifice 33 or 34, and respective metering orifices 33 and 34 are so designed that a rich mixture charge is fed to the sub-combustion chamber 3 and a lean mixture charge is fed to the main combustion chamber 2. As a result, a mixture charge being fed to the sub-combustion chamber is extremely rich, such that the mixture charge is positively fired by the ignition plug 5 to produce combustion flames, and thus the combustion flames enter through the through-hole 4 to the main combustion chamber, whereby a lean mixture fed to the main combustion chamber is completely burnt.

With the construction described, a ratio in amount, of the mixture charge being fed to the main combustion chamber and to that of the sub-combustion chamber, as well as a ratio in air-fuel-ratio, of the mixture charge being fed to the main combustion chamber and to that of the sub-combustion chamber are both maintained at a given value throughout the entire zone of running, and thus the torch type, internal combustion engine fulfills its inherent functions. To feed a mixture charge to the sub-combustion chamber, the sub-intake passage 10 having the orifice 13, the sub-fuel passage 32 having the orifice 34 and the fuel discharge valve 36 only are used, so that simplicity in construction results.

In the embodiment of FIG. 1, as a fuel controlling system for the injection carbureter, there is adopted a system in which pressures of fuel prevailing on the upstream and downstream sides of the metering orifices 33 and 34 are individually controlled by means of fuel controlling valve and fuel discharge valves, respectively, and thus controlling a flow rate of fuel. In place of the fuel controlling system described, there may be used fuel controlling systems as shown in FIGS. 2 and 3.

Figure 2:
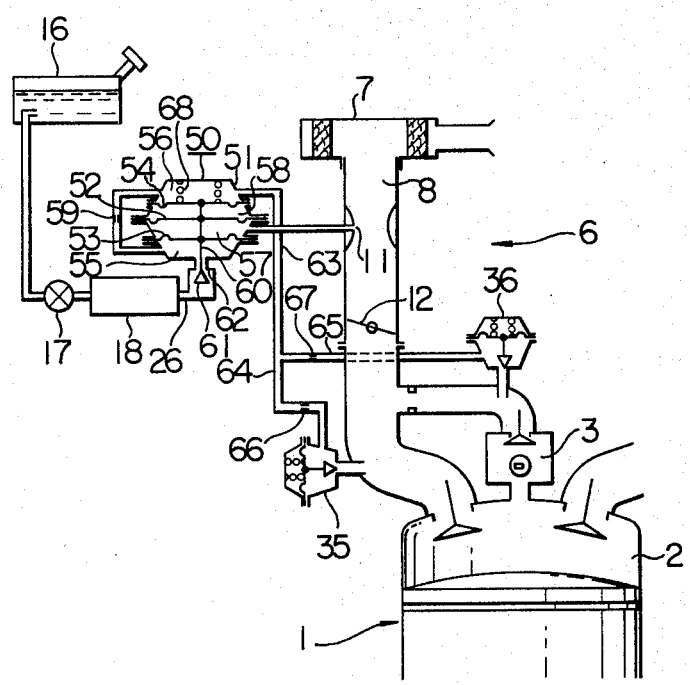

In the embodiment of FIG. 2, fuel is controlled in a manner that a pressure difference in fuel prevailing on the upstream and downstream sides of a measuring orifice is proportional to negative pressure in the venturi portion. In FIG. 2, the components common to those of FIG. 1 are shown by the same reference numerals. The fuel pressure controlling valve 50 has a casing 51, a diametrically large diaphragm 52, and diametrically small diaphragms 53 and 54 which are disposed in the casing in parallel relation to one another, thereby defining four chambers. The four chambers consist of an upstream chamber 55 to which fuel is to be fed, a downstream chamber 56 communicating by way of a metering orifice 59 with the upstream chamber 55, a negative pressure chamber 57 into which is introduced negative pressure in the venturi portion 11 which receives an amount of air introduced under suction, and an atmospheric pressure chamber 58 open to atmosphere. The diaphragms 53 and 54 are equal in cross-sectional area. A valve rod 60 is rigidly secured to the center of the three diaphragms 52, 53 and 54. By a combination of a valve body 61 attached to the end of the valve rod and a valve seat 62, negative pressure in the venturi and a pressure difference, in fuel, prevailing on the upstream side of the measuring orifice 59 and the downstream side thereof are balanced to each other. In the downstream chamber 56, there is provided a spring 68, whose spring force is generally set to zero. Connected to the downstream chamber 56 is a fuel passage 63, which is bifurcated into a main fuel passage 64 and a sub-fuel passage 65, which are connected to the fuel discharge valves 35 and 36, respectively. Respective fuel passages 64 and 65 have metering orifices 66 and 67 for distributing fuel at a given ratio to respective fuel passage. The metering orifices 66 and 67 are so designed that a pressure difference in fuel prevailing on the upstream side and the downstream side of these orifices is smaller than that in fuel prevailing on the upstream side and downstream side of the metering orifice 59, so that a level of fuel discharge pressure in the fuel discharge valves 35 and 36 may be substantially equal to a level of fuel pressure in the downstream chamber 56 in the fuel pressure controlling valve 50. With the construction described, the total amount of fuel fed depends upon a pressure difference in fuel prevailing on the upstream and downstream sides of the main metering orifice 59, and the aforesaid pressure difference in fuel is automatically controlled so as to be in balance with the negative pressure in the venturi portion, so that the amount of fuel passing through the main measuring orifice 59 is proportional to the amount of air passing through the venturi portion 11, and hence the air-fuel-ratio as a whole is maintained constant. Fuel metered in the metering orifice 59 is introduced to the metering orifices 66 and 67, in which a flow-rate distribution ratio of fuel is determined according to resistance imposed on the metering orifices 66 and 67, and then injected from the fuel discharge valves 35 and 36 into the main and sub-intake passages. Either in this embodiment, an amount and an air-fuel-ratio, of mixture charges being fed to the main combustion chamber and to the sub-combustion chamber are both maintained at a given ratio. The features of the embodiment of FIG. 2 consist in that the total air-fuel-ratio is controlled to a given ratio by the main measuring orifice 59 and fluctuation in fuel pressure experienced in the fuel discharge valves 35 and 36 may be automatically compensated for by the fuel pressure controlling valve usually acting to control a pressure difference in such prevailing on the upstream side and downstream side of the main measuring orifice.

Figure 3:
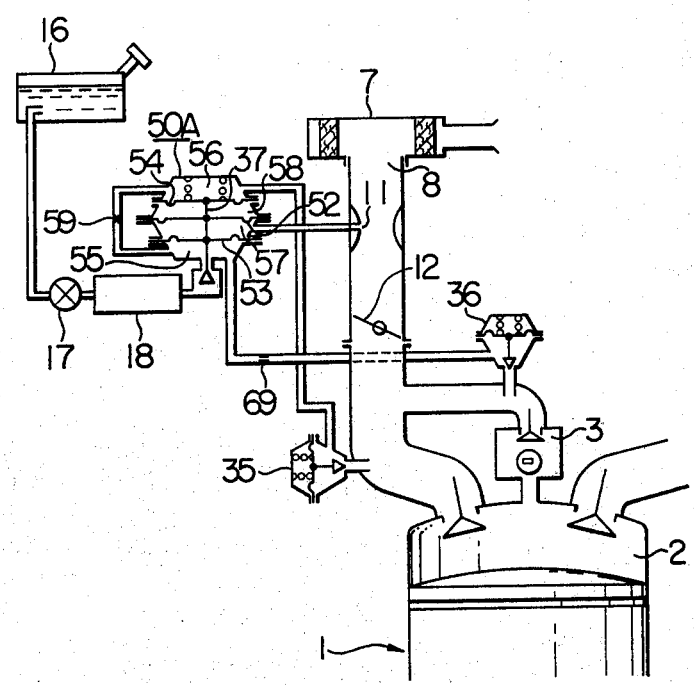

A fuel controlling system shown in FIG. 3 is a compromise between those of FIGS. 1 and 2. The fuel pressure controlling valve 50A in this embodiment has four chambers 55, 56, 57 and 58 as in the fuel pressure controlling valve 50 shown in FIG. 2, but differs from the latter in the points that the fuel passage leading from the downstream chamber 56 is connected only to the main fuel discharge valve 35, while the fuel passage leading from the upstream chamber 55 is connected by way of a metering orifice 59 to the sub-fuel discharge valve 36. The feature of the embodiment consists in that fuel pressure may be set to a low level, as compared with that in the fuel controlling system shown in FIG. 2.

In the embodiments shown, the main fuel discharge valve 35 is disposed downstream of the branch point of the intake cylinder. The valve may be disposed on the upstream side thereof. In such a case, a mixture charge equal in an air-fuel-ratio to that fed to the main combustion chamber is fed to the sub-intake passage, and fuel is added by the sub-fuel discharge valve to a mixture charge thus introduced to the sub-intake passage, thereby providing a rich mixture charge to the sub-combustion chamber.

According to the present invention, the intake system and fuel controlling system are extremely simple in construction, and a ratio in amount, of mixture charges being fed to the main combustion chamber and to the sub-combustion chamber, and a ratio in air-fuel-ratio, of mixture charges being fed to respective combustion chambers are both maintained at a given value throughout the entire range of running modes.

What is claimed is:

1. In an intake system adapted to be used in combination with an internal combustion engine including a main combustion chamber, a sub-combustion chamber equipped with an ignition plug, and a through-hole communicating said both chambers with each other, whereby a lean mixture charge in the main combustion chamber is fired by combustion flames produced in said sub-combustion chamber, the improvements comprising;

an intake cylinder having a venturi portion allowing the passing of a total amount of air being fed to said main and sub-combustion chambers and a throttle valve controlling the amount of air being fed thereto;

a main intake passage leading from said intake cylinder to said main combustion chamber;

a sub-intake passage stemed from said intake cylinder and leading to said sub-combustion chamber;

a first fuel discharge device attached to at least one of said intake cylinder and main intake passage;

a second fuel discharge device attached to said sub-intake passage;

a fuel supplying device;

a fuel pressure controlling device connected to said fuel supplying device and producing a fuel pressure commensurate with a negative pressure in said venturi portion;

a first fuel passage communicating said fuel pressure controlling device with said first fuel discharge device; and, a second fuel passage communicating said fuel pressure controlling device with said second fuel discharge device.

2. An intake system as defined in claim 1, wherein said first fuel discharge device is attached to said main intake passage.

3. An intake system as defined in claim 2, wherein a metering orifice is provided in said sub-intake passage.

4. An intake system as defined in claim 2, wherein a metering orifice is provided in at least one of said first and second fuel passages.

5. An intake system as defined in claim 3, wherein a metering orifice is provided in at least one of said first and second fuel passages.

6. An intake system as defined in claim 5, wherein said first and second fuel discharge devices are fuel discharge valves capable of injecting fuel at a pressure of a given level.

7. An intake system as defined in claim 3, wherein metering orifices are provided in said first and second fuel passages, respectively, and said first and second fuel discharge devices are fuel discharge valves capable of injecting fuel at a pressure of a given level.

8. An intake system as defined in claim 7, wherein said fuel pressure controlling device comprises a casing; a diametrically large diaphragm and a diametrically small diaphragm; said casing and said two diaphragms defining three chambers consisting of an intermediate chamber defined by two diaphragms and said casing and serving as a negative pressure chamber communicating with said venturi portion, a chamber defined by said diametrically large diaphragm and said casing serving as an atmospheric chamber open to atmosphere, and a chamber defined by said diametrically small diaphragm and said casing and serving as a fuel chamber connected to said fuel supplying device; a rod attached to said two diaphragms; and a valve body attached to said rod and adapted to open and close a passage communicating said fuel chamber with said fuel supplying device; said fuel chamber being communicated with said first and second fuel passages.

9. An intake system as defined in claim 7, wherein said fuel pressure controlling device comprises a casing; three diagrams disposed in said casing in parallel relation to one another, to thereby divide the interior of the casing into four parallel chambers, outwardly located diaphragms of said diaphragms being equal in size with each other and having an area smaller than that of the other diaphragm; a passage for communicating two outwardly located chambers with each other; a main metering orifice provided in said passage; said four chambers consisting of the two outwardly located chambers, one of which is an upstream chamber connected to said fuel supplying device and the other of which is a downstream chamber, a chamber continuous to said upstream chamber and serving as a negative pressure chamber connected to said venturi portion, and a chamber contiguous to said downstream chamber and serving as an atmospheric chamber open to atmosphere, said downstream chamber being connected to said first and second fuel passages; a rod attached to said three diaphragms; and a valve body attached to said rod and adapted to open and close a passage communicating said upstream chamber with said fuel supplying device.

10. An intake system as defined in claim 3, wherein;
said first and second fuel discharge devices are fuel discharge valves capable of injecting fuel at a pressure of a given level;
said fuel pressure controlling device comprises a casing, three diaphragms disposed in said casing in parallel relation to one another, to thereby divide the interior of said casing into substantially parallel four chambers, two outer diaphragms of said diaphragms being equal in area and having an area smaller than the other diaphragm, a passage for communicating two outwardly located chambers with each other, a metering orifice provided in said passage, said four chambers consisting of the two outwardly located chambers, one of which is an upstream chamber connected to said fuel supplying device, and the other of which is a downstream chamber, a chamber contiguous to said upstream chamber and serving as a negative pressure chamber connected to said venturi portion, and a chamber contiguous to said downstream chamber and serving as an atmospheric chamber open to atmosphere, said downstream chamber being connected to said first fuel passage, and said upstream chamber being connected to said second fuel passage; a rod attached to said three diaphragms and a valve body attached to said rod and adapted to open and close a passage communicating said upstream chamber with said fuel supplying device; and,
said second fuel passage has a metering orifice.

* * * * *